Feb. 4, 1969   A. U. BRYANT ET AL   3,425,662
VALVE CONSTRUCTION WITH RETRACTABLE SEAT RINGS
Filed Sept. 14, 1965
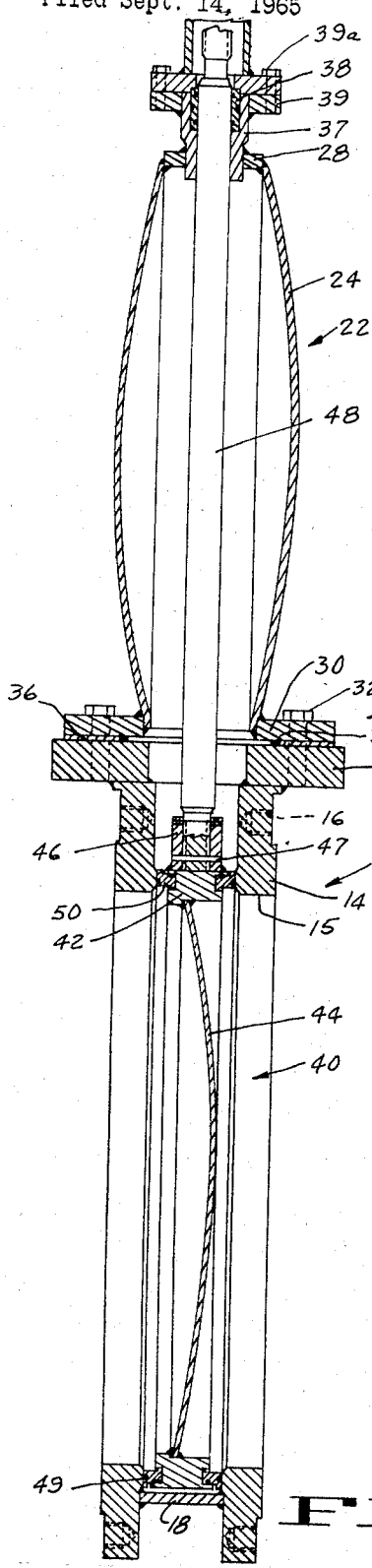
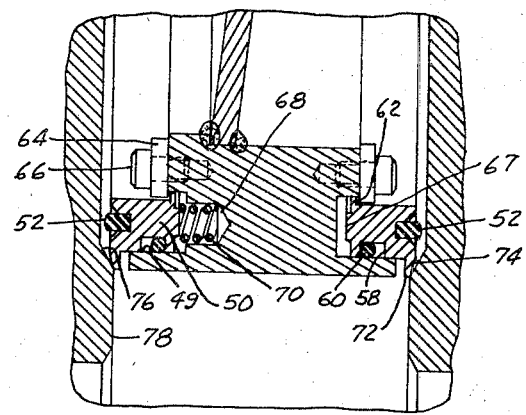
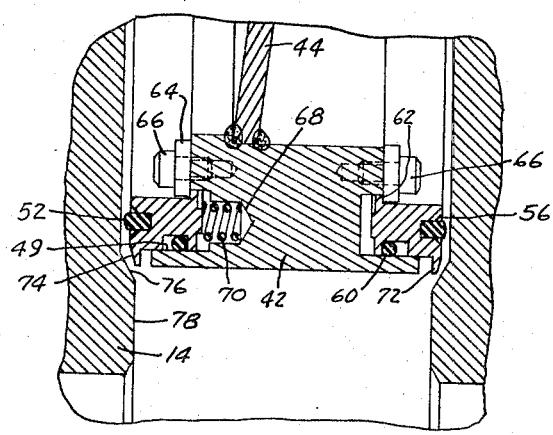
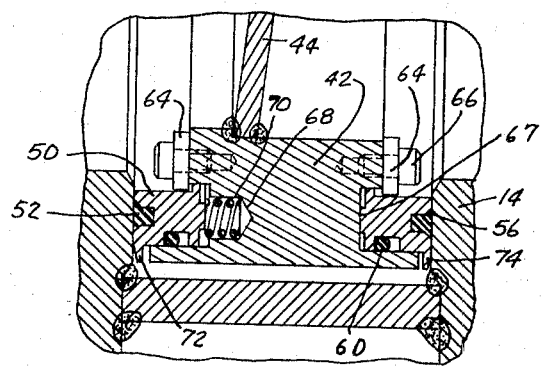
INVENTORS
AUSTIN U. BRYANT
MARVIN G. COMBES
BY
Gregg & Stidham
ATTORNEYS.

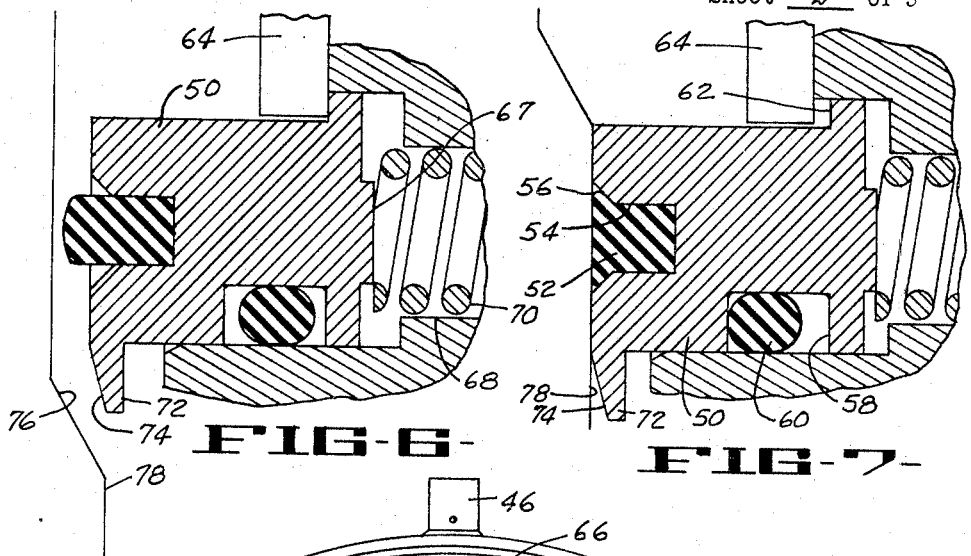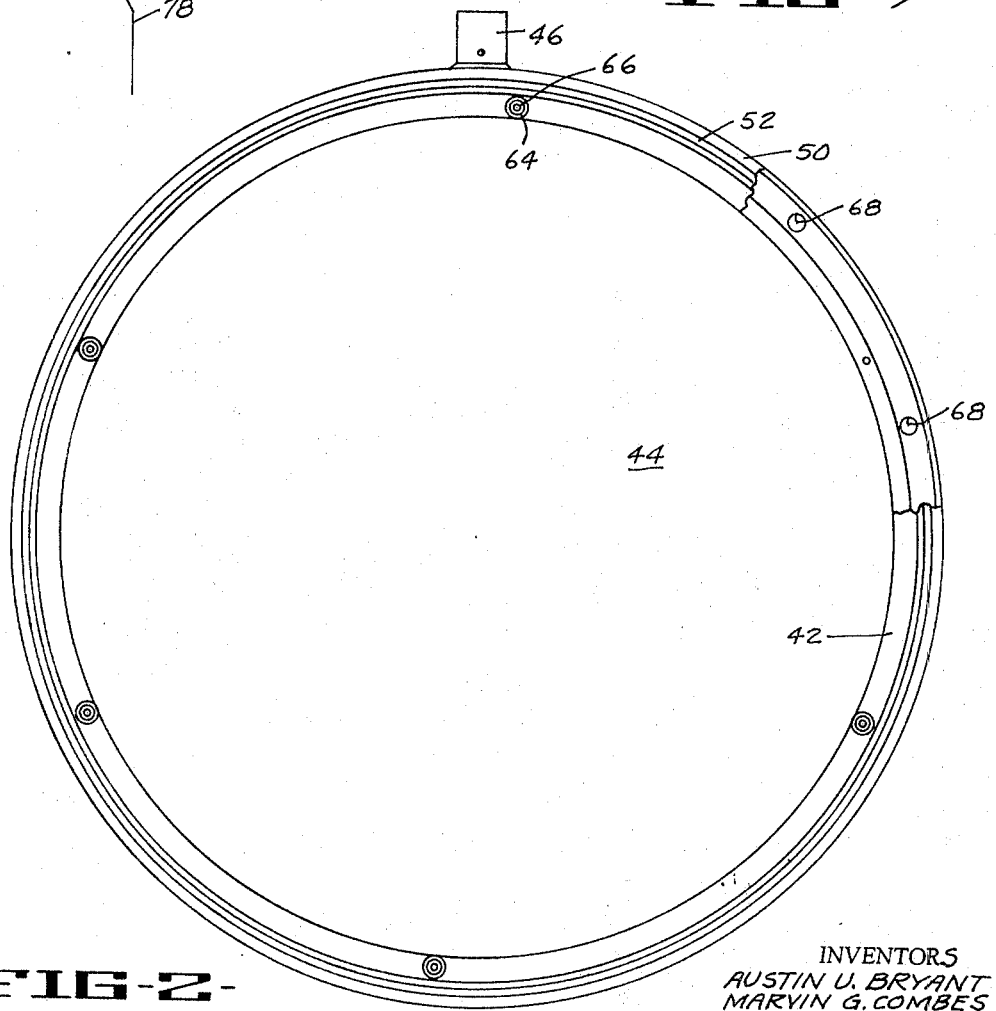

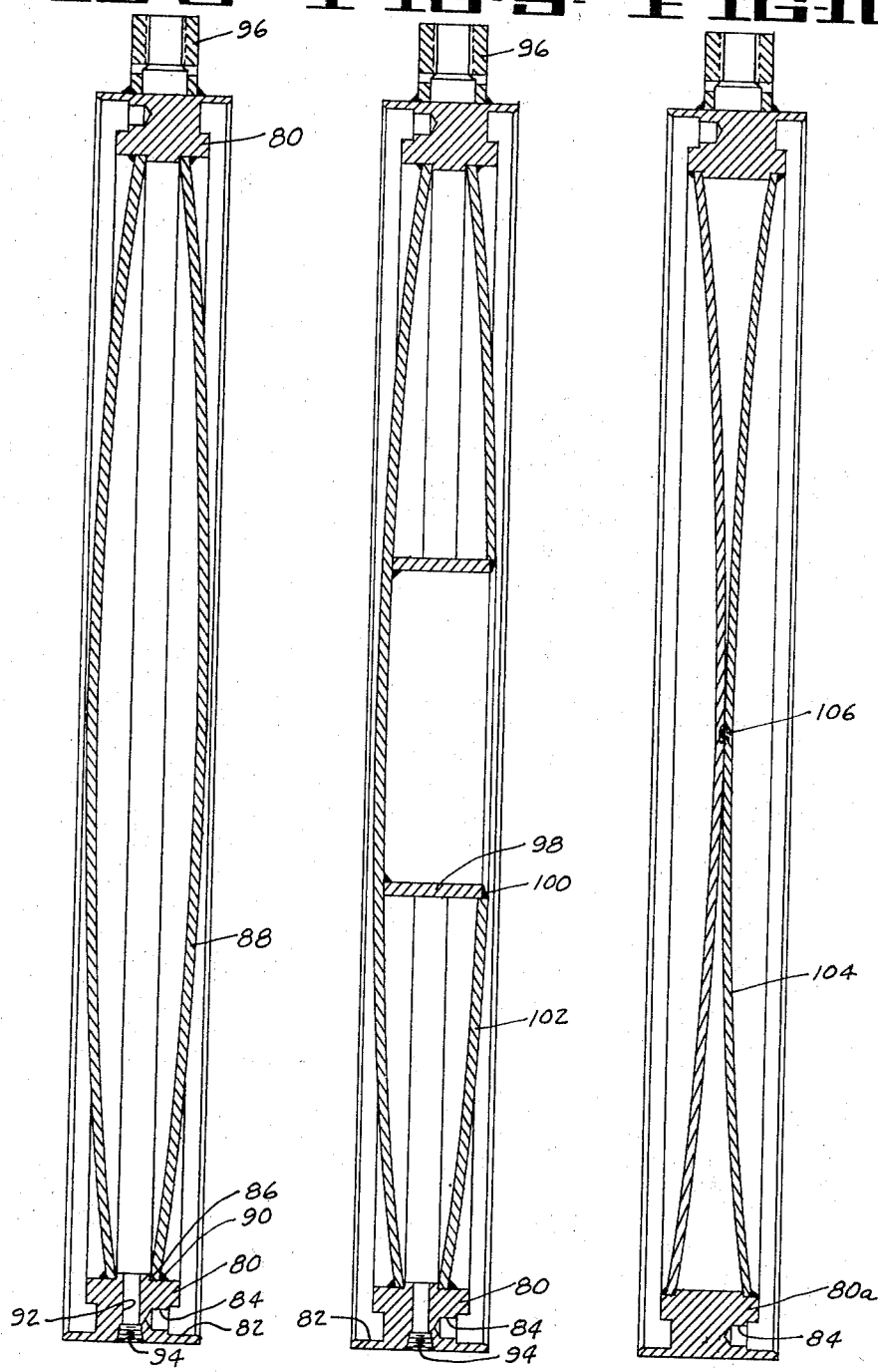

United States Patent Office 3,425,662
Patented Feb. 4, 1969

3,425,662
VALVE CONSTRUCTION WITH RETRACTABLE SEAT RINGS
Austin U. Bryant, Walnut Creek, and Marvin G. Combes, Castro Valley, Calif., assignors to Grove Valve and Regulator Company, Oakland, Calif., a corporation of California
Filed Sept. 14, 1965, Ser. No. 487,266
U.S. Cl. 251—176          11 Claims
Int. Cl. F16k 3/14, 3/28, 1/26

ABSTRACT OF THE DISCLOSURE

A gate valve with a closure disc comprising an annular member carrying seat rings and a dished disc sealed around its circumference to the annular member. In open position of the gate stop members limit outward movement of the seat rings so that they are free from engagement with the wall of the valve body. In the positions in which they are restrained the seat rings engage wedging surfaces on the body as the gate is moved toward closed position and are retracted thereby.

---

This invention relates to a valve construction and, more particularly, to a valve closure disc and means for mounting seat rings and seals on such disc.

In some gate valves, i.e. through conduit gate valves, the valve gate is moved within a body space between open and closed positions wherein an imperforate portion of the gate and an opening therethrough are, respectively, moved into alignment with the flow passages. On the other hand, with a short gate, a closure disc is moved completely into and out of alignment with the flow passages between closed and open positions. When the valve is in closed position, the sealing may be effected by axially movable seat rings which, for reasons which will become apparent, are preferably carried on the gate rather than on the body. It is, of course, necessary that the seat rings be capable of sufficient axial movement to insure sealing contact with the opposing valve body surfaces, and therefore, if fully extended and unopposed, would protrude beyond the space between the body working surfaces. In some valve structures it has been found desirable to increase the space between the body walls away from the sealing surfaces at the open position of the valve gate in order to relieve the seals of any contacting pressure when the valve is open. However, a difficulty has been encountered in that if the seals and seat rings are fully extended, they cannot fit between the opposing body wall working surfaces when the gate is returned to its closed position.

It is, therefore, an object of this invention to provide a novel seat ring arrangement wherein seat rings are mounted on the gate and though extended are free from contact during open position, but are retractable into sealing engagement in the closed position.

Seat rings may be mounted on the gate in annular recesses and in such case the gate must, of course, be thick enough to permit the cutting of each reecss. The thickness of the gate is also dictated by the space between the valve body working surfaces. Thus, considerations of space and strength may require a considerable amount of metal in a conventional valve gate. However, these gate thickness requirements extend only to the annular portion of the gate wherein the seat rings are carried, and in many instances it is possible to reduce the thickness of the central portion of the gate to that which is sufficient to withstand pressures encountered.

It is, therefore, another object of this invention to provide a valve gate made up largely of relatively thin metal sheet or plate.

In carrying out this invention, there is provided a gate valve having a lower body section with opposing walls spaced fairly close together and a valve gate movable between the walls into closed position. The valve gate has a rigid outer seat ring supporting ring and the overall weight of the gate is reduced by spanning the ring with a disc of thin metal that has been dished into concave configuration for added strength. Seat rings carried on opposite faces of the outer valve gate ring engage opposing valve body working surfaces to seal both upstream and downstream when the gate is in its closed position. The upper body section into which the gate moves when in open position has opposing walls that are spaced farther apart because they are expanded outward to form concave inner surfaces for added strength. This invention, therefore, contemplates the provision of complementary engaging means on the valve gate and the seat ring which limits the extent to which the seat rings may protrude from the recesses. We also provide cooperating wedging surfaces on the valve body and the seat rings which engage as the valve gate moves into its closed position wherein the gate may move into the restricted clearances of the closed position.

Other objects and advantages of this invention will become apparent from the description following when read in conjunction with the accompanying drawings wherein:

FIG. 1 is a vertical section view of a gate valve embodying features of this invention;

FIG. 2 is a front elevation of the valve gate with seat rings mounted in accordance with our invention;

FIGS. 3, 4 and 5 are enlarged partial section views showing the valve gate in closed position, open position and intermediate position, respectively;

FIGS. 6 and 7 are further enlarged partial section viwes of the seat rings in open and closed positions, respectively; and FIGS. 8 and 10 are vertical section views of valve closure disc embodiments forming a part of this invention.

Referring now to FIG. 1, the valve body 10 preferably comprises a lower body section 12 having opposite end walls 14 of relatively thick plate material with flow passages 15 through them and tapped holes 16 for coupling the valve in a flange connection. Welded between the end walls 14 is a generally U-shaped body band 18 and to the top of the end walls and body band is welded a flange 20 for connection to the upper body section 22. The upper body section may be formed with end walls 24 of relatively thin sheet or plate metal which have been expanded outward under pressure to provide concave surfaces for increased resistance to both internal and external pressures. Welded between the end walls is an inverted U-shaped body band 28 and to the bottom of the end plates and body band is welded a flange 30 that is engaged by bolts 32 to complete the assembly. An O-ring 34 or other suitable sealing means embraced by a retainer ring 36 seals the connection. To the upper end of the top body section 22 is welded a bearing sleeve 37 including a seal-carrying sleeve 38 and a flange 39 to which a valve operator (not shown) is connected by capscrews 39a.

The valve gate or closure disc 40 of this invention comprises a seat ring carrier ring 42 to which is welded a dished disc 44 to complete a closure disc. A threaded coupling 46 welded to the top of the carrier ring threadedly receives the end of the valve stem 48, with a pin 47 securing the connection. As is conventional, the stem 48 is vertically slidable in the bearing sleeve 37 to raise and lower the gate 40. In each annular face of the seat ring carrier ring 42 are formed the annular seat ring grooves or recesses 49 which freely receive the seat rings 50 permitting them to move axially.

The seat rings 50 may be of metal or a fairly rigid plastic, and they preferably carry a resilient seal member 52 which may be molded into a recess 54 in the outer surface (FIGS. 6 and 7). Preferably, the recess is tapered outwardly at 56 forming a flared opening into which the resilient seal ring 32 may be distorted when compressed, as shown in FIG. 7. A groove 58 around the outer cylindrical surface of the seat ring 50 receives a suitable resilient seal member such as the O-ring 60 and a radical shoulder 62 around the inner surface of the seat ring is engaged by a series of stop members, such as the arcuately spaced washers 64 which are secured by screws 66 to the annular face of the carrier ring. Also arcuately spaced around the carrier ring 42 are spring holes 68 which are bored to receive coil springs 70 which bias the seat rings 50 axially outward into sealing engagement.

A radial shoulder 72 extending from the forward surface of the seat ring is chamfered at 74 to form a wedging surface, and complementary wedging surfaces 76 are formed on the body walls 14 terminating in raised working surfaces 78 on the end walls against which the seat ring seals.

With the seat rings 50 on the gate 40, they move with the gate into open position, remote from the bottom of the valve where foreign matter is more likely to accumulate. This is of particular advantage with a short gate as shown here, since the seat rings are out of contact and extended with more room for dirt behind them. Thus, the seat rings are moved away from the major source of dirt and, in addition, they are fully received in annular recesses which provide minimum exposure to the flowing fluid. It is true that the outer surfaces of the seat rings 50 are so exposed, but the O-rings 60 prevent the fluid from getting behind the seat ring where it might prevent full retraction or otherwise impede operation. Moreover, clearances between the internal shoulders 62 on seat rings 50 and their accommodating recesses 49 are held to a minimum to reduce the possibility of dirt particles entering behind the seat rings and in addition, any sediment that might lodge on the seat rings 50 has to pass uphill over the shoulders 62 before it can get behind the seat rings 50. An annular rib 67 provides space behind the seat rings to accommodate any dirt that does enter, without interfering with operation of the seat rings.

Mounting of the seat rings on the gate has the further advantage of providing room for the stop members 64 and their screws 66 to engage the inner shoulder 62 of the seat rings, without reducing the size of the flow passage.

When the valve is in the closed position shown in FIG. 3, the valve gate is forced axially downstream so that the downstream seat ring 50 is bottomed in its recess 48 and the coil springs 70 behind the upstream seat ring urge it into sealing engagement with the corresponding working surface 78. This spring pressure is augmented by the upstream pressure itself to which the trailing surface of the upstream seat ring 50 is exposed over its full area bounded by the O-ring 60. Since at the front face of the seat ring the line pressure is exposed to just that area within the main seal ring 52, the seat ring 50 is urged into sealing pressure as long as the line pressure exceeds within the body space. On the other hand, should the body space pressure become excessive by an amount sufficient to overcome the springs 70, the upstream seat ring will back away to relieve the body pressure into the upstream line.

When the gate is moved to the open position shown in FIG. 4, the gate is centered by reason of pressure equalization and the seat rings 50 are extended by their coil springs 70. However, the stop washers 64 engage the radial shoulder 62a to limit the movement of the seat rings and hold them out of contact with the valve body wall 14.

Then, as the gate moves toward closed position the chamfered lip 74 on the seat ring 50 engages the complementary wedging surface 76 on the valve body to retract the seat ring and permit the valve gate to move into the relatively restricted space between the valve body working surfaces.

Referring now to FIGS. 8 to 10, I have shown forms of valve closure discs which include two dished discs as major components. For example, in FIG. 8 the seat ring retainer ring 80, with seat ring recesses 82 and spring holes 84, has internal shoulders 86 on which are supported sheet metal discs 88 and welded around their peripheries 90 to form a fluid-tight enclosure between them. Then, through an opening 92 in the ring 80, fluid is introduced at a pressure sufficient to cause the discs 88 to expand outward to the configuration shown. The opening 92 through which the pressure fluid was introduced is plugged at 94 and the threaded sleeve 96 is welded to the outside of the carrier ring, adapting it for connection to the valve stem.

The structure of FIG. 8 may be further strengthened by applying some reinforcing means between the concave inner surfaces. For example, the space between the discs could be filled with sand or some other non-compressible substance or, as shown in FIG. 9, a coaxial reinforcing sleeve 98 may be inserted through a hole 100 in one of the discs 102 and welded between them to form a completely sealed enclosure around the sleeve 98.

The valve disc of FIG. 10 is formed in a manner similar to those just described, except that after the discs 104 are welded to the carrier ring 80a, they are exposed to external pressure as by placing the assembly within a pressure chamber (not shown). Hence, the closure disc of FIG. 10 presents a concave surface to both upstream and downstream pressures. If desired, the concave discs themselves may be welded together at 106 for added strength.

While this invention has been described in connection with a preferred embodiment thereof, it is understood that modifications and changes therein may be made by those skilled in the art without departing from the spirit and scope of this invention as defined by the claims appended hereto.

What is claimed is:
1. A valve construction comprising:
a valve body having flow passages therethrough,
at least one working surface on said valve body surrounding one of said flow passages,
a valve closure disc mounted for planar movement in said valve body between a closed position in alignment with said flow passages and an open position in a body space out of alignment therewith,
a seat ring carried on said valve closure disc engageable with said working surface when said valve closure member is in said closed position,
said seat ring and said working surface being generally parallel to each other,
said seat ring being on said closure disc,
resilient means biasing said seat ring toward said working surface,
first and second seat ring positioning surfaces on said valve body and said seat ring engagable when said valve closure disc moves from said open position to said closed position,
the wall surfaces of said body space opposite said open position being displaced further from the plane of movement of said valve closure disc than said working surface, and
stop means on said valve closure disc for limiting axial movement of said seat ring in said body space to a position free of said wall surfaces but wherein engagement of said positioning surfaces is assured during such movement, one of said seat ring positioning surfaces being a wedging surface to retract said seat ring during said movement.

2. The valve construction defined by claim 1 wherein said seat ring positioning surfaces comprise complementary wedging surfaces on said seat ring and on a valve body wall, the wedging surface on the valve body wall terminating in a working surface.

3. The valve construction defined by claim 1 wherein:
there are a pair of seat rings movable axially on opposite sides of said valve closure disc,
there are a pair of working surfaces on said valve body, and
there are stop means on said valve closure member for limiting axial movement of both of said seat rings.

4. The valve construction defined by claim 1 including:
means forming an annular recess in the outer face of said seat ring,
said recess having a bottom wall and side walls that extend from said bottom wall in generally parallel relationship and then diverge to form a flared recess opening,
a resilient seal ring having parallel side walls which fit snugly between the parallel portions of the recess side walls and extend outwardly into said flared opening, and a convex outer portion extending beyond said outer face of the seat ring to engage and seal against said working surface when said closure disc is in its closed position said seal ring being deformed when so engaged so that portions thereof are accommodated in the flared opening.

5. The valve structure defined by claim 1 wherein said valve closure disc comprising:
an annular seal ring carrier,
a seal ring in at least one face of said carrier, and
a circular disc of relatively thin material secured around the inner surface of said disc and sealed therewith, said disc being dished so that one surface thereof is concave.

6. A valve closure disc comprising:
an annular seal ring carrier,
annular grooves in opposite faces of said ring carrier intermediate the circular edges thereof,
a seat ring carried in each of said annular grooves,
a pair of circular discs of relatively thin material secured around the inner surface of said seal ring carrier and sealed therewith,
said discs being dished so that one surface of each is concave and its opposite surface is convex.

7. The valve closure disc defined by claim 6 wherein the concave surfaces of said discs face each other.

8. The valve closure disc defined by claim 6 including reinforcing means between said discs to resist inward bending thereof.

9. The valve closure disc defined by claim 6 wherein said reinforcing means comprises:
means forming a circular opening cut in one of said discs,
a coaxial sleeve accommodated in said opening, and
means sealing around said sleeve and both of said discs.

10. The valve closure disc defined by claim 6 wherein said convex surfaces are disposed toward each other.

11. The valve closure disc defined by claim 6 including a reinforcing ring secured between and around the outer edges of said discs.

References Cited

UNITED STATES PATENTS

| | | | |
|---|---|---|---|
| 2,079,896 | 5/1937 | Brosius | 251—372 X |
| 3,033,515 | 5/1962 | Brisbane | 251—327 X |
| 3,065,951 | 11/1962 | Fannema | 251—174 X |
| 3,069,129 | 12/1962 | Grove | 251—176 X |
| 3,258,243 | 6/1966 | Bryant | 251—193 X |
| 3,301,523 | 1/1967 | Lowrey | 251—328 X |

HAROLD W. WEAKLEY, *Primary Examiner.*

U.S. Cl. X.R.

251—328, 329